US012607718B1

(12) United States Patent
Bergen et al.

(10) Patent No.: US 12,607,718 B1
(45) Date of Patent: Apr. 21, 2026

(54) METHODS AND SYSTEMS FOR DETERMINING THE AVAILABLE STORAGE CAPACITY OF AN ENCLOSED SPACE

(71) Applicant: Pro-Vision Spartan Radar, LLC, Byron Center, MI (US)

(72) Inventors: Scott Bergen, New Canaan, CT (US); Tyler Rather, Redondo Beach, CA (US)

(73) Assignee: Pro-Vision Spartan Radar, LLC, Byron Center, MI (US)

( * ) Notice: Subject to any disclaimer, the term of this patent is extended or adjusted under 35 U.S.C. 154(b) by 312 days.

(21) Appl. No.: 18/451,537

(22) Filed: Aug. 17, 2023

Related U.S. Application Data

(63) Continuation of application No. 18/448,732, filed on Aug. 11, 2023, now abandoned.

(60) Provisional application No. 63/397,356, filed on Aug. 11, 2022.

(51) Int. Cl.
    *G01S 7/41* (2006.01)
(52) U.S. Cl.
    CPC .................................... *G01S 7/412* (2013.01)
(58) Field of Classification Search
    CPC ....................................................... G01S 13/04

USPC ........... 342/124; 73/305, 306; 324/637, 642, 324/644
See application file for complete search history.

(56) References Cited

U.S. PATENT DOCUMENTS

2023/0221163 A1* 7/2023 Sai ...................... G01S 13/4463
                                                        342/124

* cited by examiner

*Primary Examiner* — Ladimir Magloire
*Assistant Examiner* — Eric K Hodac
(74) *Attorney, Agent, or Firm* — Price Heneveld LLP

(57) ABSTRACT

The present disclosure generally relates to systems and methods for determining the available storage capacity of an enclosed space using radar-based digital terrain modeling. At a high-level, embodiments of the present disclosure may determine the available storage capacity of a certain space by using one or more radars to transmit one or more radio-frequency signals through the space and receive various reflections or echoes of those signals. These received echoes may be processed to determine—for a grid dividing the overall space into a series of right rectangular prisms stacked into columns—the highest (i.e., closest to the ceiling of the space) right rectangular prism (RRP) in each column that is at least partially occupied by a physical object. For each column, the highest RRP and any RRPs below it may be marked as occupied and any RRPs above the highest RRP may be marked as unoccupied.

19 Claims, 8 Drawing Sheets

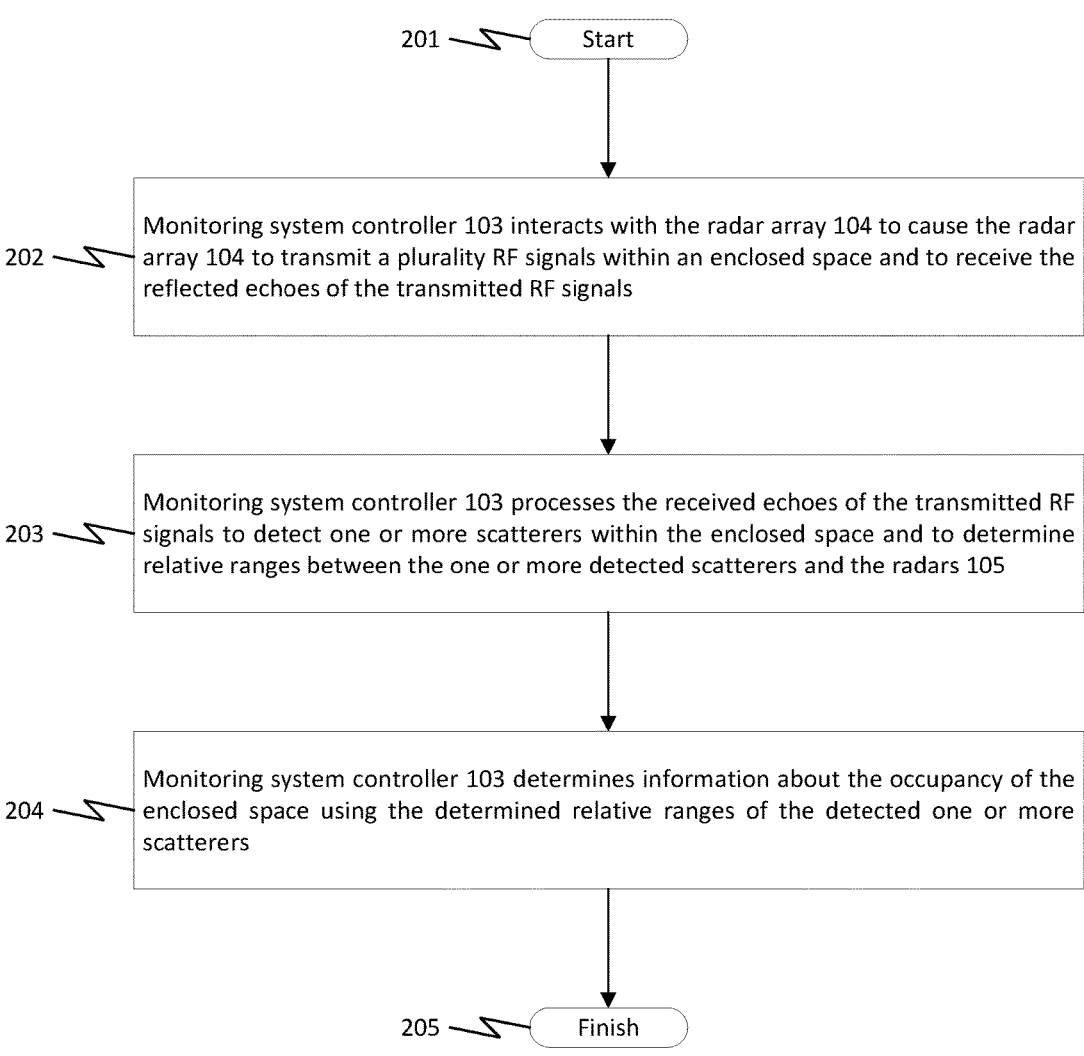

201 — Start

202 — Monitoring system controller 103 interacts with the radar array 104 to cause the radar array 104 to transmit a plurality RF signals within an enclosed space and to receive the reflected echoes of the transmitted RF signals 203 — Monitoring system controller 103 processes the received echoes of the transmitted RF signals to detect one or more scatterers within the enclosed space and to determine relative ranges between the one or more detected scatterers and the radars 105

204 — Monitoring system controller 103 determines information about the occupancy of the enclosed space using the determined relative ranges of the detected one or more scatterers 205 — Finish

FIG. 2

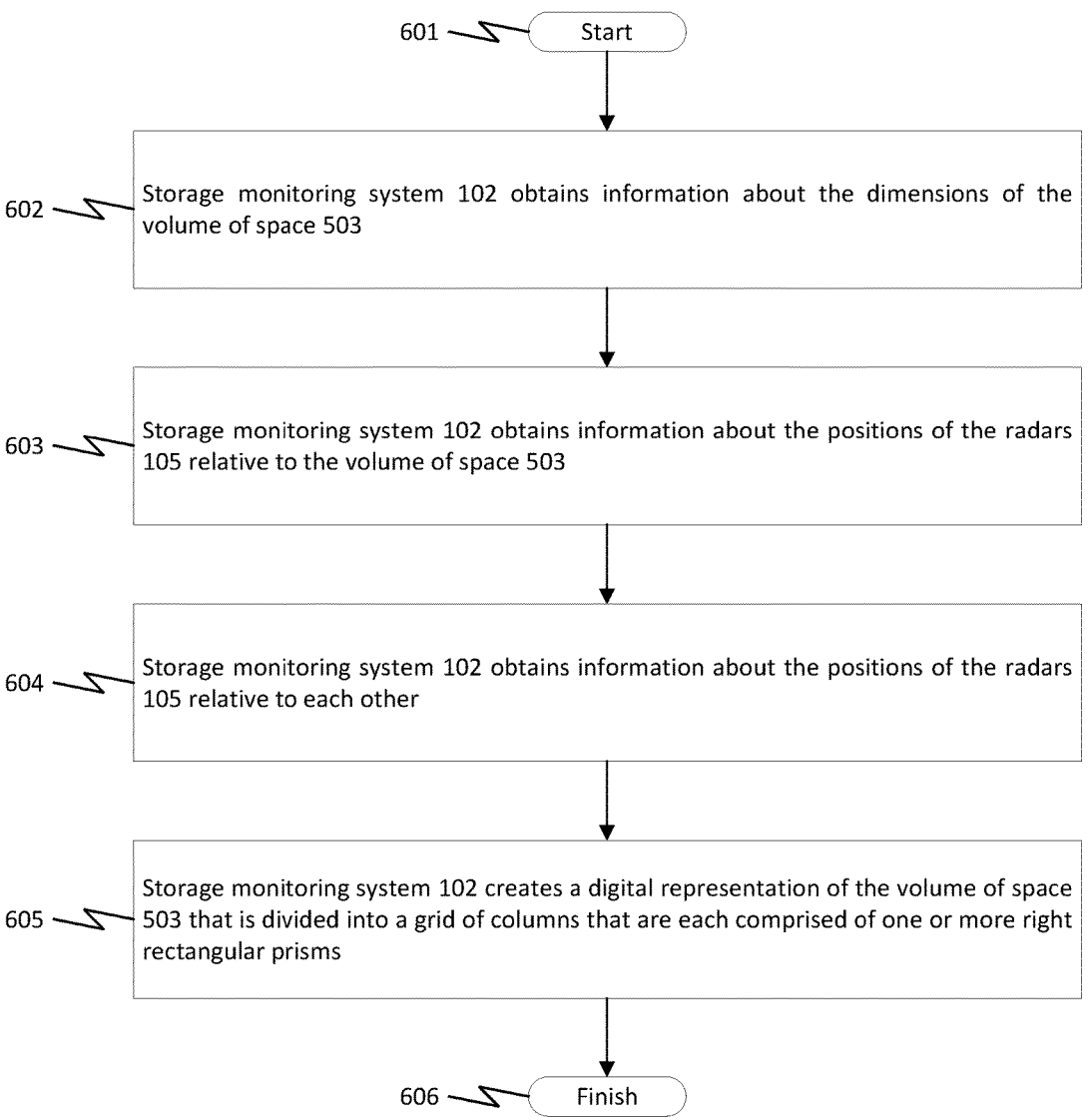

601 — Start

602 — Storage monitoring system 102 obtains information about the dimensions of the volume of space 503

603 — Storage monitoring system 102 obtains information about the positions of the radars 105 relative to the volume of space 503

604 — Storage monitoring system 102 obtains information about the positions of the radars 105 relative to each other 605 — Storage monitoring system 102 creates a digital representation of the volume of space 503 that is divided into a grid of columns that are each comprised of one or more right rectangular prisms 606 — Finish

FIG. 6

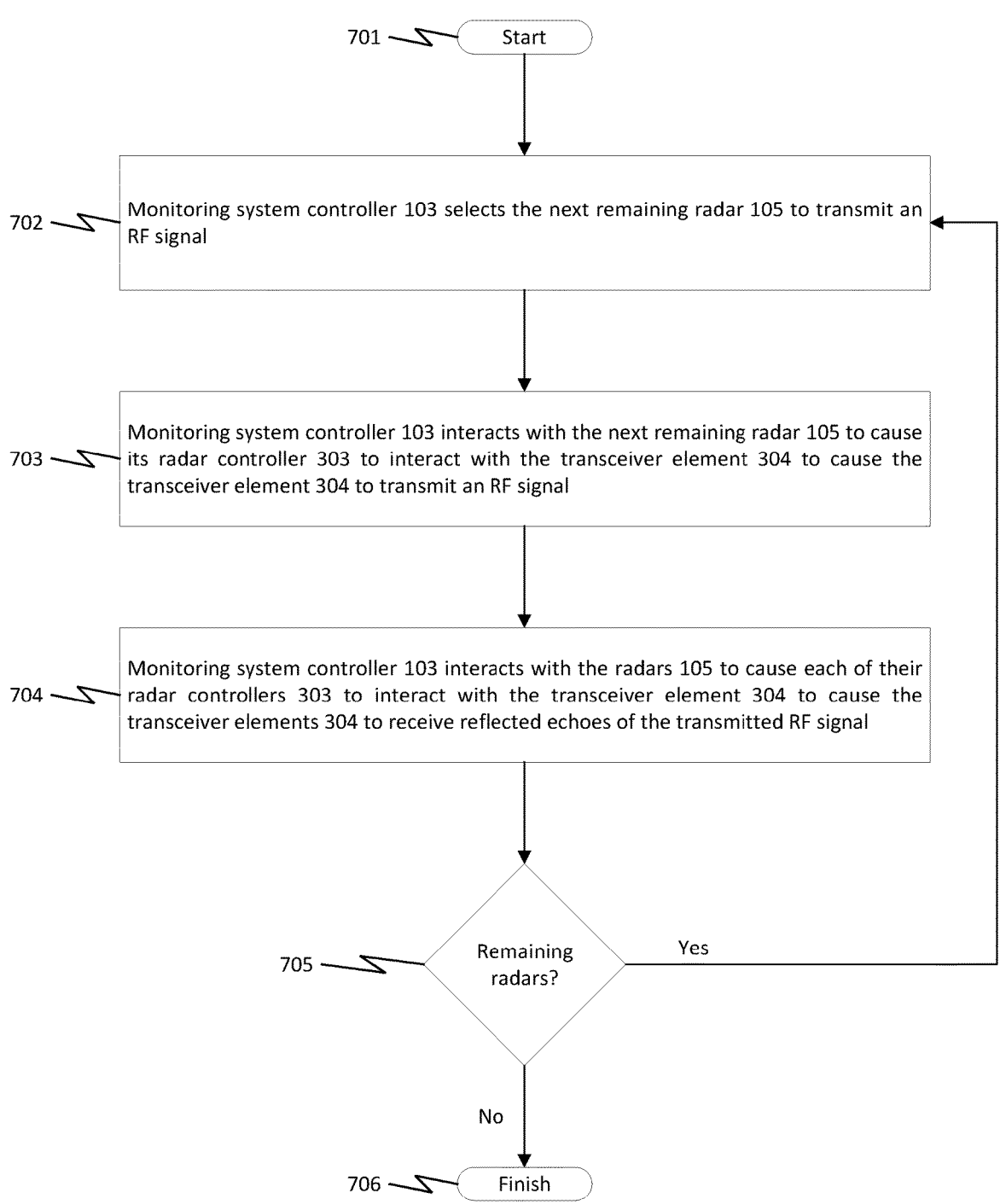

701 — Start

702 — Monitoring system controller 103 selects the next remaining radar 105 to transmit an RF signal 703 — Monitoring system controller 103 interacts with the next remaining radar 105 to cause its radar controller 303 to interact with the transceiver element 304 to cause the transceiver element 304 to transmit an RF signal 704 — Monitoring system controller 103 interacts with the radars 105 to cause each of their radar controllers 303 to interact with the transceiver element 304 to cause the transceiver elements 304 to receive reflected echoes of the transmitted RF signal 705 — Remaining radars?

Yes

No

706 — Finish

FIG. 7

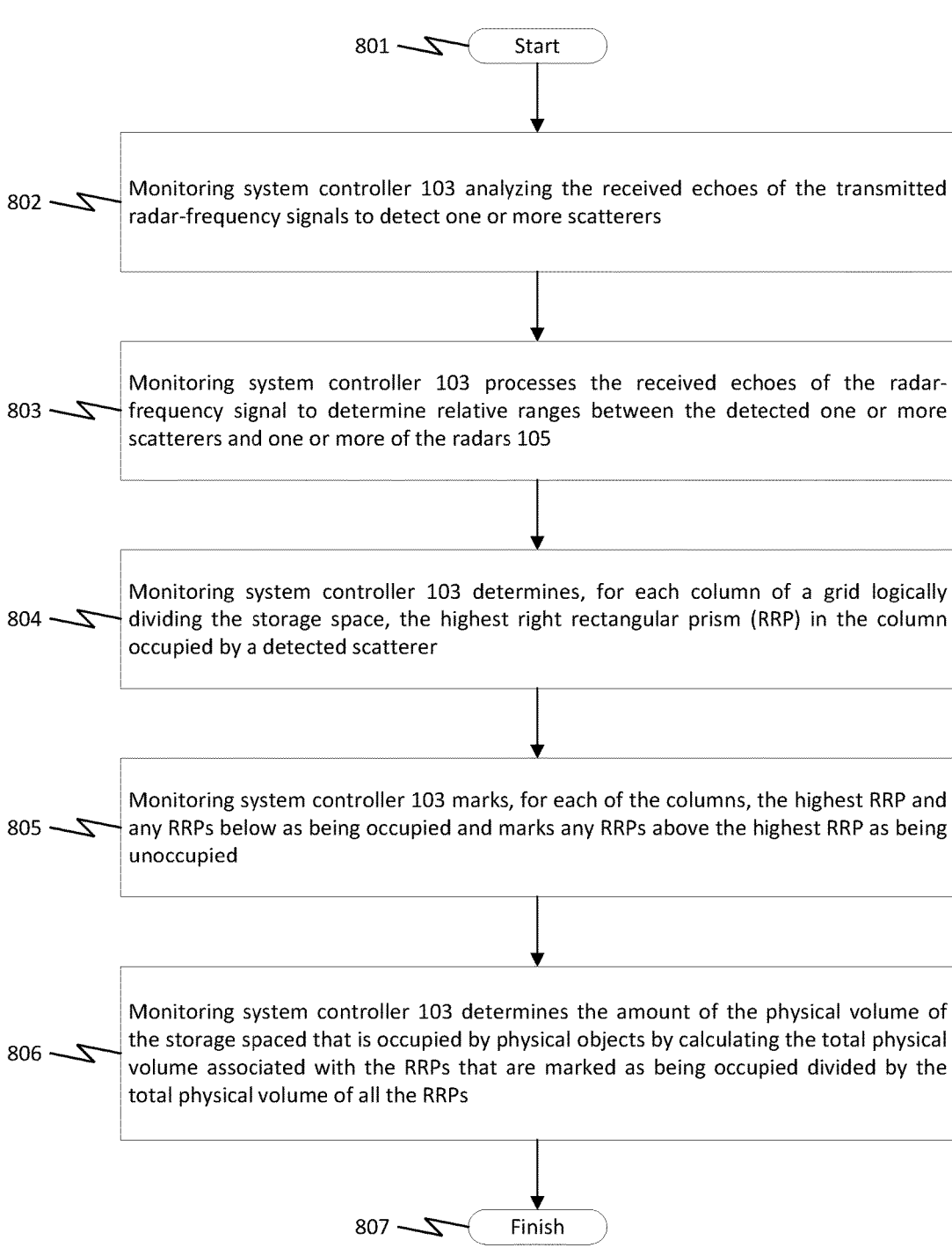

801 — Start

802 — Monitoring system controller 103 analyzing the received echoes of the transmitted radar-frequency signals to detect one or more scatterers 803 — Monitoring system controller 103 processes the received echoes of the radar-frequency signal to determine relative ranges between the detected one or more scatterers and one or more of the radars 105

804 — Monitoring system controller 103 determines, for each column of a grid logically dividing the storage space, the highest right rectangular prism (RRP) in the column occupied by a detected scatterer 805 — Monitoring system controller 103 marks, for each of the columns, the highest RRP and any RRPs below as being occupied and marks any RRPs above the highest RRP as being unoccupied 806 — Monitoring system controller 103 determines the amount of the physical volume of the storage spaced that is occupied by physical objects by calculating the total physical volume associated with the RRPs that are marked as being occupied divided by the total physical volume of all the RRPs 807 — Finish

FIG. 8

METHODS AND SYSTEMS FOR DETERMINING THE AVAILABLE STORAGE CAPACITY OF AN ENCLOSED SPACE

CROSS-REFERENCE TO RELATED APPLICATIONS

This application is a continuation of and claims priority to U.S. patent application Ser. No. 18/448,732, entitled "Methods and Systems for Determining the Available Storage Capacity of an Enclosed Space" and filed on Aug. 11, 2023, which is incorporated herein by reference. U.S. patent application Ser. No. 18/448,732 claims priority to U.S. Provisional Patent Application No. 63/397,356, filed on Aug. 11, 2022, which is incorporated herein by reference in its entirety.

BACKGROUND

Technical Field

The present disclosure generally relates to determining the available storage capacity of an enclosed space, and more particularly, methods, systems, apparatuses, and non-transitory computer readable media for determining the available storage capacity of an enclosed space using radar-based digital terrain modeling.

Description of the Background

An important task for many businesses is monitoring items that they are currently storing. This is often especially true for businesses heavily involved in the movement and transportation of various goods, where efficient and effective use of the storage space in the business's fleet of transportation vehicles are particularly desirable. In this regard, the efficiency of the space utilization heavily impacts the operating costs associated with shipping operations. Underutilization of a vehicle's cargo capacity means less goods transported per trip (from the distribution point(s) to various destinations), thereby requiring more trips and significantly increasing costs.

Existing solutions for cargo monitoring are often inaccurate, costly, and/or require significant maintenance. Thus, more effective cargo monitoring systems capable of being implemented and maintained at a relatively low cost are greatly desired.

BRIEF DESCRIPTION OF THE DRAWINGS

Embodiments and various aspects of the present disclosure are illustrated in the following detailed description and the accompanying figures. Various features shown in the figures are not drawn to scale.

FIG. 2 is a flowchart of an exemplary method of assessing the occupancy of an enclosed space using radar.

FIG. 6 is a flowchart of an exemplary method of configuring a storage monitoring system.

FIG. 7 is a flowchart of an exemplary method of generating and measuring RF signals, such as was described in FIG. 2.

FIG. 8 is a flowchart of an exemplary method of determining information about the occupancy of an enclosed space using received radar signal reflections, such as was described in FIG. 2.

DETAILED DESCRIPTION

Figure 1:
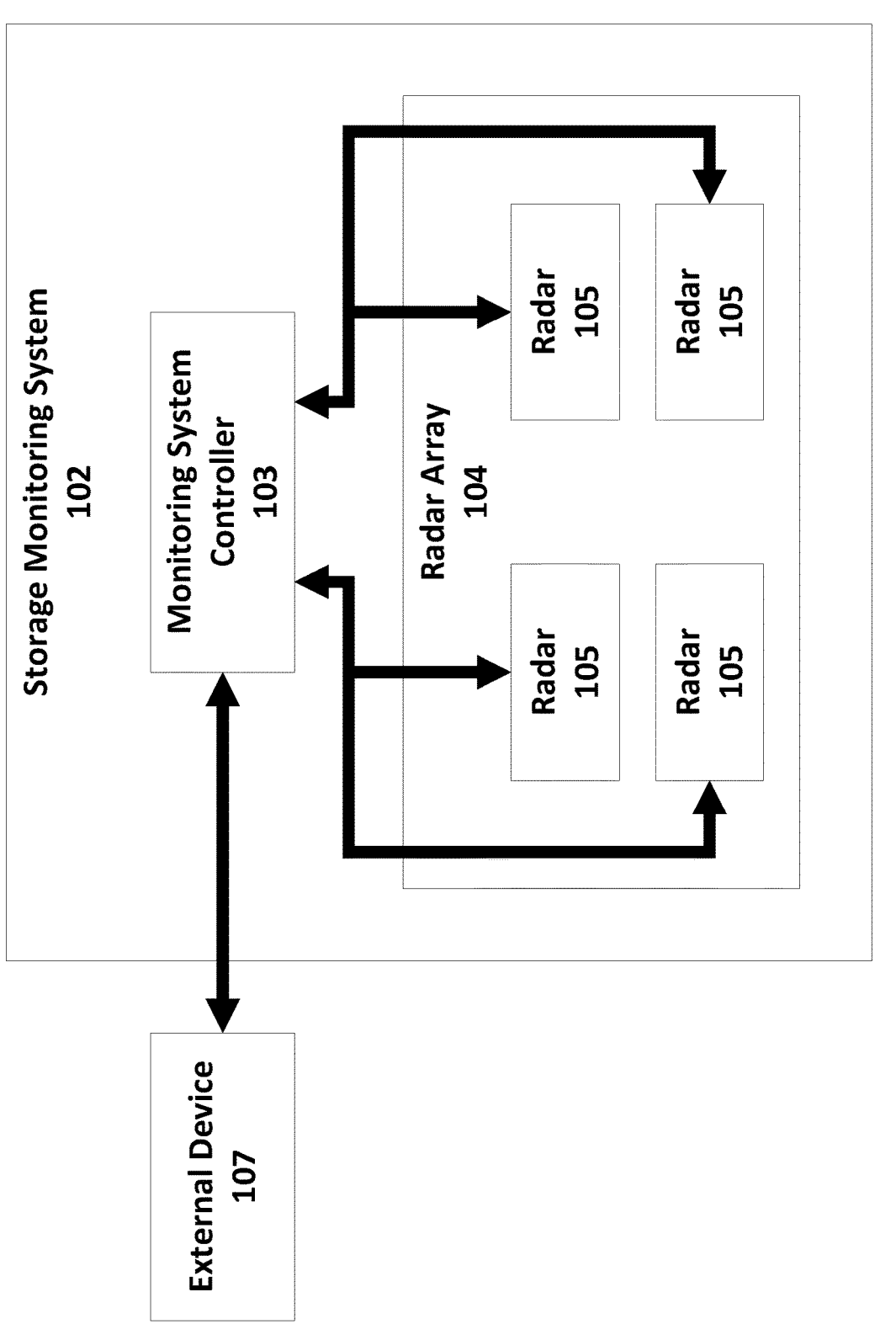
FIG. 1 shows a block diagram of a storage monitoring system in accordance with an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

At a high-level, embodiments of the present disclosure may determine the available storage capacity of a certain space (i.e., three-dimensional volume) by measuring what amount of that space is occupied by physical objects. In turn, to measure what percentage of space is occupied, embodiments of the present disclosure may utilize one or more radars systems. The radar systems may transmit one or more radio-frequency signals through the space and receive various reflections or echoes of those signals. These received echoes may be processed to determine—for a grid dividing the overall space into a series of right rectangular prisms (e.g., cubes) stacked into columns—the highest (i.e., closest to the ceiling of the space) right rectangular prism (RRP) in each column that is at least partially occupied by a physical object, and all RRPs below it in the same column, may be considered occupied. Conversely, all the RRPs in each column that are above the highest RRP occupied by an object may be considered unoccupied.

Transportation and storage of goods play a key role in modern-day society. Modern day supply chains and transportations networks are often quite complex, with a given shipment being transferred between vehicles and warehouses multiple times between its origin and destination. Because of the high throughput of goods between various vehicles and storage areas (e.g., warehouses), an important aspect of the shipping process is keeping track of what—in the general sense of occupying volume—is currently stored in a vehicle's cargo area or in a warehouse's storage area.

One reason keeping track of what is currently stored within a vehicle's cargo area or warehouse's storage area is useful is that the high throughput of goods entering and leaving a warehouse may sometimes lead to mistakes or errors in the loading or unloading process. For instance, for goods being delivered to a warehouse on a semi-trailer, it may often be the case that the entirety of the contents of the semi-trailer is being delivered. It is possible, however, that through miscommunication or similar type of error, the tractor-trailer may only partially (or even not at all) unloaded before it is prompted to depart. This is obviously an undesirable outcome, and the ability to determine the occupancy of a tractor-trailer could potentially prevent this outcome. In a similar example, for goods being placed onto a semi-trailer for transport, it may often be the case that most of the space within the tractor-trailer is typically used. It is possible, however, that through miscommunication, the tractor-trailer is only partially loaded before it is prompted to depart. Like before, this is an undesirable outcome, and the ability to determine the occupancy of a tractor-trailer could potentially prevent this outcome.

Another type of example, a tractor-trailer, after being loaded, could be temporarily held at the loading center (e.g., a warehouse). For instance, if there are no available drivers and/or tractor units that can haul the tractor-trailer. In this case, the tractor-trailer may be allowed to remain at the loading bay or may be temporarily moved to a holding area. In either case, through miscommunication or a similar type of error, the trailer may be overlooked and allowed to remain even after a tractor unit becomes available (or whatever reason the tractor-trailer was being held for expires). Unnecessarily delaying the transportation of goods is often undesirable, and the ability to detect that a tractor-trailer is occupied (but not moving) may potentially be used to prevent this outcome. As a related example, goods being held at a warehouse may, for some reason, be overlooked and allowed to remain for an unnecessarily long amount of time. The ability to determine the occupancy of various portions of a warehouse may potentially be utilized to detect that the goods occupying an area has been unchanging for a certain amount of time, potentially preventing this outcome.

One reason keeping track of what is currently stored within a vehicle's cargo area or warehouse's storage area is useful is to improve the efficiency of the shipping process. At a high-level, this may be summarized as trying to deliver the most packages in the least amount of time using the least number of trips. Note, however, that this does ignore certain nuances, such as the desire to ensure that all packages are delivered within a certain amount of time. It also ignores that, in certain cases, there may be trade-offs between delivering goods in the least number of trips and delivering goods in the least amount of time. Nevertheless, improvements in efficiency that decrease the number of necessary trips also may generally be used to decrease the necessary amount of time, and vice-versa.

As a simple but relevant detail, note that the physical capacity of a vehicle's storage area (often called a cargo hold, in this context) is limited. Thus, the ability of a vehicle to transport cargo is limited to packages or other goods with physical dimensions that allow them to collectively fit within the storage area. Also note that vehicles, as physical objects, must travel from their current location (wherever it may be) to a pickup point before cargo can be loaded onto the vehicle. As a final detail, note that some deliveries involve moving only cargo between a single pickup point and a single destination-referred to as less than truckload (LTL) shipping—and some deliveries may involve picking up cargo from multiple pickup points and/or delivering cargo to multiple destinations-referred to as full truckload (FTL) shipping.

For FTL shipping, it is important to know what portion of a vehicle's storage area is being utilized in order to determine if the vehicle is able to pickup additional goods from a destination. Complicating this problem, however, is that the portion of a vehicle's storage area that is being utilized may change as goods are dropped off at various destinations. Thus, the ability to determine in real-time (or near real-time) are greatly desired.

To resolve these issues, embodiments of the present disclosure may utilize radio-frequency (RF) signals to evaluate the current storage capacity of an enclosed space, embodiments of the present disclosure may utilize one or more radars systems to transmit one or more radio-frequency signals through the space and receive various reflections or echoes of those signals. These received echoes may be processed to determine—for a grid dividing the overall space into a series of right rectangular prisms (e.g., cubes) stacked into columns—the highest (i.e., closest to the ceiling of the space) right rectangular prism (RRP) in each column that is at least partially occupied by a physical object, and all RRPs below it in the same column, may be considered occupied. Conversely, all the RRPs in each column that are above the highest RRP occupied by an object may be considered unoccupied.

FIG. 1 shows a block diagram of a storage monitoring system in accordance with an exemplary embodiment of the present disclosure. As shown by the figure, a storage monitoring system 102 may comprise a monitoring system controller 103 and a radar array 104, which comprises one or more radars 105. The monitoring system controller 103 is connected to the radar array 104 and may use the radars 105 to generate and transmit various radio-frequency (RF) signals. The controller 103 may also receive and record reflected echoes of these signals. In some embodiments, the monitoring system controller103 may be connected to one or more external devices 106 which, among other things, may allow the monitoring system controller 103 to report information about utilization of a space between the radars 105 and a lower surface (e.g., a floor).

As an example, the external devices 106 may include a display device that display the reported information to a user. For example, the external device 106 may comprise one or more computer systems, such as smartphones, laptop or desktop computers, or other devices that are configured to process and display information to users.

As will be described in more detail below, the monitoring system controller 103 is generally configured to control the operation of the storage monitoring system 102. The controller 103 may be implemented in hardware or a combination of hardware with software or firmware. In some embodiments, the controller 103 comprises at least one processor configured to execute instructions stored in memory for performing at least some of the functionality ascribed to the controller 103.

FIG. 2 is a flowchart illustrating a process of assessing the occupancy of an enclosed space using a storage monitoring system, such as the storage monitoring system 102. To start, as shown by block 202 of FIG. 2, the monitoring system controller 103 may interact with the radar array 104 to cause the radar array 104 to transmit a plurality RF signals within an enclosed space and to receive the reflected echoes of the transmitted RF signals.

After the radar array 104 generates the RF signals and receives their reflected echoes, as shown by block 203 of FIG. 2, the monitoring system controller 103 may process the received echoes of the transmitted RF signals to detect one or more scatterers within the enclosed space and to determine relative ranges between the one or more detected scatterers and the radars 105.

After the monitoring system controller 103 detects the one or more scatterers and determines the relative ranges between them and the radars 105, as shown by block 204 of FIG. 2, the monitoring system controller 103 may determine information about the occupancy of the enclosed space using the determined relative ranges of the detected one or more scatterers.

Figure 3:
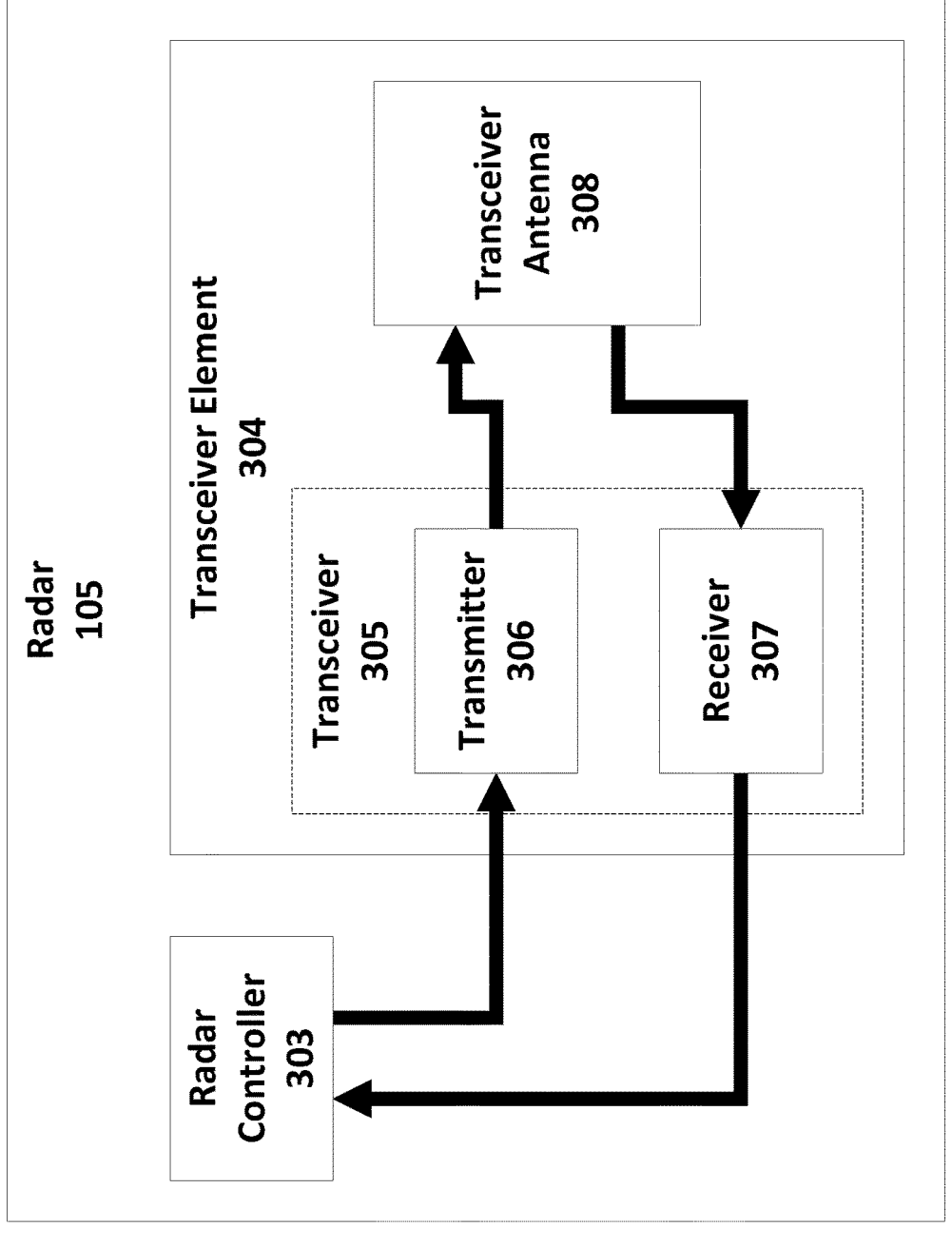
FIG. 3 shows a block diagram of a radar, such as is shown in FIG. 1.

FIG. 3 shows a diagram of a radar, such as the radar 105 shown in FIG. 1. As shown by the figure, a radar 105 may comprise a radar controller 303 and a transceiver element 304. The transceiver element 304 may comprise a transceiver 305 and a transceiver antenna 308. Lastly, the transceiver 305 may comprise a transmitter 306 and a receiver 307. In general, the radar controller 303 is connected to the transmitter 306 and the receiver 307 (i.e., is connected to the transmitter 306 and the receiver 307). In turn, the transceiver 305 (i.e., the transmitter 306 and the receiver 307) is connected to the transceiver antenna 308.

In operation, the radar controller 303 may send a command to the transmitter 306 to transmit a radio signal with a specified frequency, amplitude, and phase. The transmitter 306 may receive this command and, in response, generate an electrical signal with a frequency, amplitude, and phase corresponding to the frequency, amplitude, and phase specified in the received command. The transceiver antenna 308 may then receive the electrical signal from the transmitter 302 and emit a corresponding radio wave signal whose frequency, amplitude, and phase are as specified in the command from the radar controller 303.

The radar controller 303 may then send a command to the receiver 307 to measure the frequency and amplitude of the radio waves being received after first modifying the phase of the received radio waves by a certain phase shift. The receiver 307 may receive this command and, in response, receive an electrical signal being generated by the transceiver antenna 308. This electrical signal is generated by the transceiver antenna 308 in response to receiving a radio wave signal that has a certain frequency, amplitude, and phase, with the generated electrical signal's frequency, amplitude, and phase corresponding to the frequency, amplitude, and phase of the received radio wave signal. After it receives the electrical signal from the transceiver antenna 308, the receiver 307 may modify the phase of the electrical signal according to the command from the radar controller 303 and then measures the modified electrical signal's frequency and amplitude.

Figure 4:
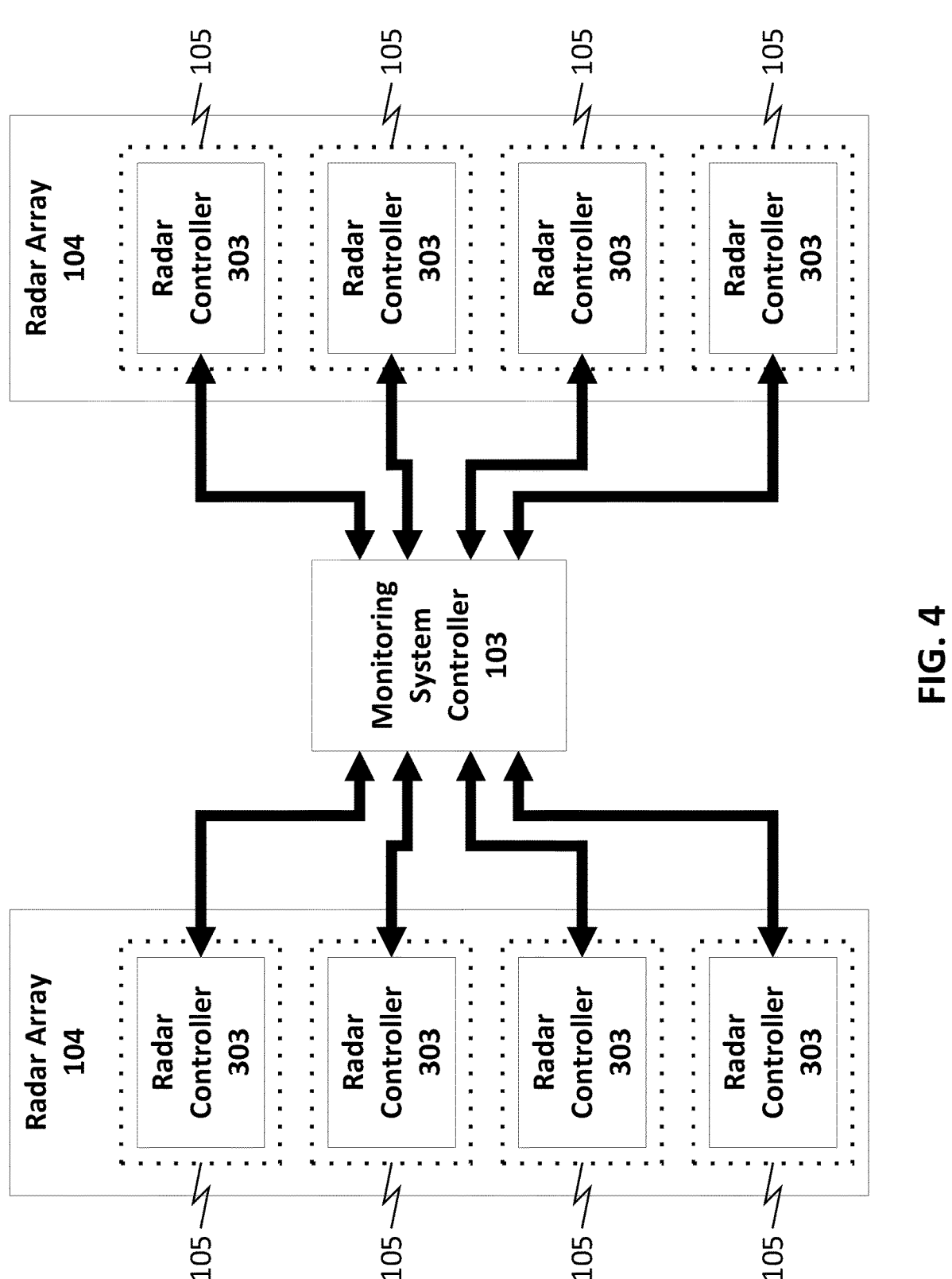
FIG. 4 shows a more detailed block diagram of a storage monitoring system.

FIG. 4 shows another block diagram of a storage monitoring system 102, such as is shown in FIG. 1. As shown by the figure, the storage monitoring system 102 comprises the radar array 104, which in turn comprises one or more radars 105. Also shown is the radar controller 303 of each of the radars 105. In general, the monitoring system controller 103 is connected to the radar controllers 303 of each of the radars 105. In operation, the monitoring system controller 103 may transmit various commands to the radar controllers 303 and may receive various data from the radar controllers 303.

Figure 5:
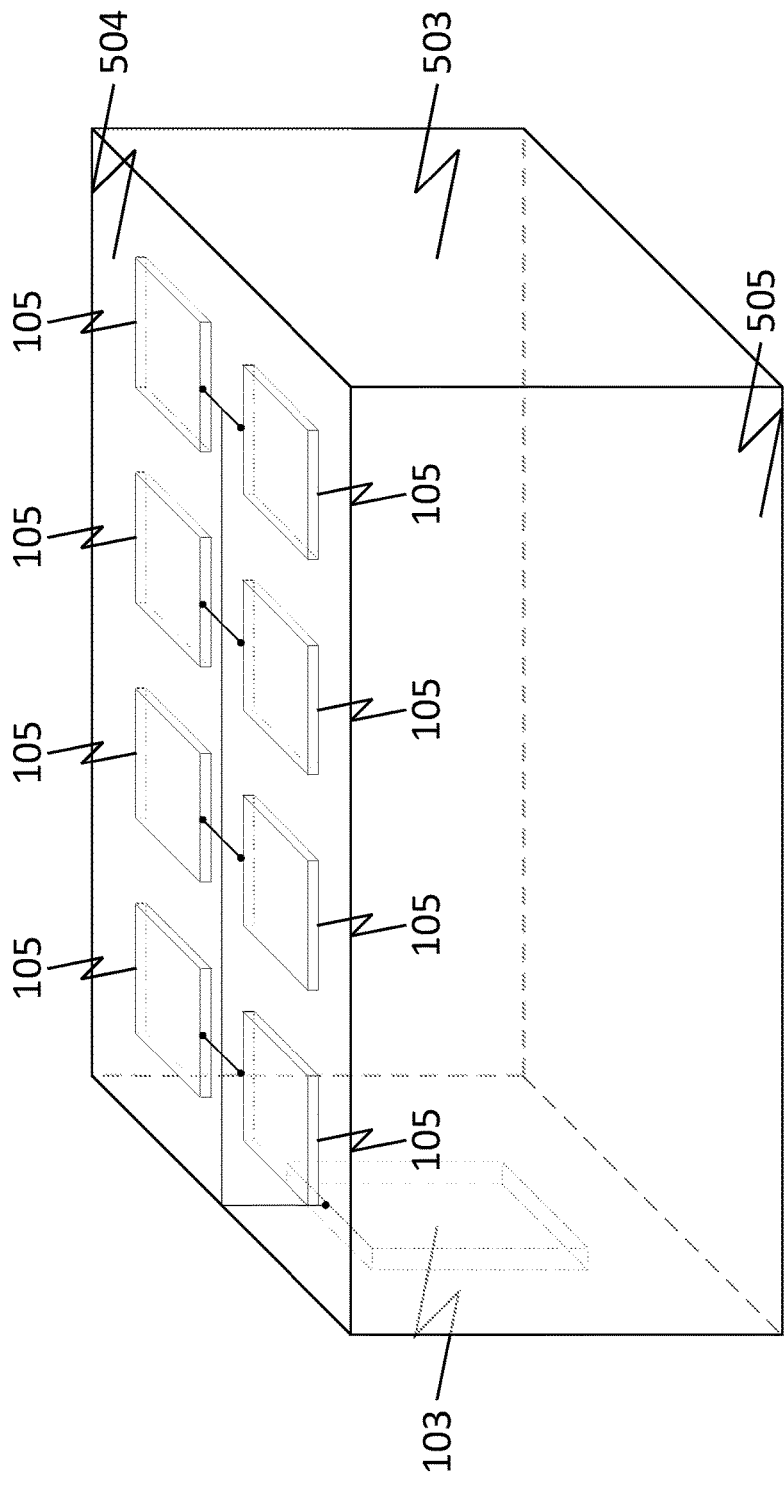
FIG. 5 shows a schematic of a storage area utilizing a storage monitoring system, such as was described in FIG. 1.

FIG. 5 shows a schematic of storage area utilizing a storage monitoring system to monitor and assess the contents of an enclosed space. Specifically, as shown by the figure, a volume of space 503 may be defined. Along one side of this space (top surface 504) are several radars 105—shown here on the "top" or "ceiling" of the space—that are facing downwards towards a lower surface (bottom surface 505) of the space-shown here as the "bottom" or "floor" of the space. Because of the position and orientation of the radars 105 relative to the bottom surface 505, the volume of space 503 is between the various radars 105 and the bottom surface. Thus, the signals transmitted by the radars 105 will propagate through the volume of space 503, until either (partially) reflecting off any objects occupying portions of the space or (partially) reflecting off the bottom surface 505, with these echoes then being received and measured by the various radars 105.

In operation, a storage monitoring system 102, such as the system depicted in FIG. 5, may involve the monitoring system controller 103 controlling the radar array 104 such that at least one signal is transmitted from the radars 105. As the signal propagates through the space 503, it may partially reflect off encountered objects, generating echoes of the transmitted signal. The monitoring system controller 103 may control the radar array 104 such that these echoes are sampled and recorded by the radars 105 as the echoes arrive at the various radars 105. These sampled echoes may be transmitted to the monitoring system controller 103 for analysis. This transmission and echo sampling may be repeated multiple times, so that an ensemble of measurement samples is received. The monitoring system controller 103 may use the sampled echoes to determine, for a predefined grid of columns stretching between the top surface 504 and the bottom surface 505, the highest (i.e., closest to the top surface 504) right rectangular prism (RRP) in each column that is at least partially occupied by a physical object. For every column, the highest occupied RRP and every RRP between it and the bottom surface 505 may be determined as being occupied by an object while every RRP above the highest RRP may be determined as being unoccupied.

In some embodiments, the radar array 104 may be configured to operate as a MIMO radar array, which may improve the accuracy and resolution of the storage monitoring system 102.

Note that, in general, a storage monitoring system may comprise only a single radar 105. Having more than one radar 105 may help to increase the resolution at which the contents of a monitored volume of space may be assessed. In other words, increasing the number of radars 105 may allow the monitored space to be divided into a greater number of smaller columns (and may allow each column to be divided into a greater number of RRPs).

FIG. 6 is a flowchart illustrating an exemplary method of configuring a storage monitoring system.

To start, as shown by block 602 of FIG. 6, the storage monitoring system 102 may obtain information about the dimensions of the volume of space 503.

After the storage monitoring system 102 obtains information about the dimensions of the volume of space 503, as shown by block 603 of FIG. 6, the storage monitoring system 102 may obtain information about the positions of the radars 105 relative to the volume of space 503.

After the storage monitoring system 102 obtains information about the positions of the radars 105 relative to volume of space 503, as shown by block 604 of FIG. 6, the storage monitoring system 102 may obtain information about the positions of the radars 105 relative to each other.

After the storage monitoring system 102 obtains information about the positions of the radars 105 relative to each other, as shown by block 605 of FIG. 6, the storage monitoring system 102 may create a digital representation of the volume of space 503 that is divided into a grid of columns that are each comprised of one or more right rectangular prisms.

FIG. 7 is a flowchart illustrating an exemplary method of generating and measuring RF signals, such as was described in FIG. 2.

To start, as shown by block 702 of FIG. 7, the monitoring system controller 103 may select the next remaining radar 105 to transmit an RF signal.

After the monitoring system controller 103 may select the next remaining radar 105, as shown by block 703 of FIG. 7, the monitoring system controller 103 may interact with the with the next remaining radar 105 to cause its associated radar controller 303 to interact with the radar's transceiver element 304 to cause the transceiver element 304 to transmit an RF signal.

After the next remaining radar 105 transmits the RF signal, as shown by block 704 of FIG. 7, the monitoring system controller 103 may interact with the radars 105 to cause each of their associated radar controllers 303 to interact with the radars' transceiver elements 304 to cause the transceiver element 304 to receive reflected echoes of the transmitted RF signal.

If there are remaining radars 105 that have yet to transmit an RF signal for this cycle, as shown by block 705 of FIG. 7, the monitoring system controller 103 may return to block 702 to select the next remaining radar 105. Otherwise, the method may end.

FIG. 8 is a flowchart illustrating an exemplary method of processing the received reflected echoes of the transmitted RF signals to determine information about the occupancy of an enclosed space, such as was described in FIG. 2.

To start, as shown by block 802 of FIG. 8, the monitoring system controller 103 may analyze the received echoes of the transmitted radar-frequency signals to detect one or more scatterers.

After the monitoring system controller 103 analyzes the received echoes of the transmitted radar-frequency signals to detect one or more scatterers, as shown by block 803 of FIG. 8, the monitoring system controller 103 may process the received echoes of the radar-frequency signal to determine relative ranges between the detected one or more scatterers and one or more of the radars 105.

After the monitoring system controller 103 detects the one or more scatterers and determines the relative ranges between them and the radars 105, as shown by block 804 of FIG. 8, the monitoring system controller 103 may determine, for each column of a grid logically dividing the storage space, the highest right rectangular prism (RRP) in the column occupied by a detected scatterer.

After the monitoring system controller 103 determines the highest RRP in each column that is occupied by a detected scatterer, as shown by block 805 of FIG. 8, the monitoring system controller 103 may mark, for each of the columns, the highest RRP and any RRPs below as being occupied and marks any RRPs above the highest RRP as being unoccupied.

After the monitoring system controller 103 marks the RRPs as being occupied or unoccupied, as shown by block 805 of FIG. 8, the monitoring system controller 103 may determine the amount of the physical volume of the storage spaced that is occupied by physical objects by calculating the total physical volume associated with the RRPs that are marked as being occupied divided by the total physical volume of all the RRPs.

Based on differences between the received signals and the expected baseline, the monitoring system controller 103 may be configured to determine one or more parameters indicative of the utilization of the space 503. As an example, based on such difference, the monitoring system controller 103 may be configured to estimate or otherwise determine a value indicating an amount of the space 503 that occupied by physical objects. For example, the value may indicate a percentage of the space that is occupied by physical objects, although other values may be determined in other examples. In some embodiments, the controller 103 is configured to transmit such parameter to an external device 107, which then displays the parameter or information based on such parameter (e.g., a graphical element) to a user. In some embodiments, the controller 103 may be configured to compare the parameter to a threshold and transmit information indicative of the comparison. As an example, the threshold may correspond to a utilization goal for the space, and the transmitted information may indicate whether such goal is satisfied by indicating whether the threshold is exceeded (e.g., whether the percentage of utilization is above a desired threshold). In other embodiments, yet other types of information may be reported based on the measurements of the signals received by the radars 105.

Based on the determined highest occupied RRPs in each column, the monitoring system controller 103 may be configured to determine one or more parameters indicative of the utilization of the space 503. As an example, based on the highest occupied RRPs, the monitoring system controller 103 may be configured to estimate or otherwise determine a value indicating an amount of the space 503 that is occupied by physical objects. For example, the value may indicate a percentage of the space that is occupied by physical objects, although other values may be determined in other examples. In some embodiments, the controller 103 is configured to transmit such parameter to an external device 107, which then displays the parameter or information based on such parameter (e.g., a graphical element) to a user. In some embodiments, the monitoring system controller 103 may be configured to compare the parameter to a threshold and transmit information indicative of the comparison. As an example, the threshold may correspond to a utilization goal for the space, and the transmitted information may indicate whether such goal is satisfied by indicating whether the threshold is exceeded (e.g., whether the percentage of utilization is above a desired threshold). In other embodiments, yet other types of information may be reported based on the measurements of the signals received by the radars 105.

In some embodiments the monitoring system controller 103 may be configured to use the determined highest occupied RRPs in each column to determine a digital representation of the approximate shape formed by the portions of the space 503 not occupied by an object (i.e., the unoccupied portion of the space 503). In some embodiments, the monitoring system controller 103 is configured to transmit this digital representation to an external device 107, which then displays the parameter or information based on such parameter (e.g., a graphical element) to a user.

As an example of determining the approximate shape of the unoccupied volume of the space 503, the monitoring system controller 103 may first use the predefined grid of columns of RRPs to generate a digital representation of the shape formed by the entire space 503. Specifically, the monitoring system controller 103 may use the predefined grid to generate digital representations of the shape of each RRPs, which are positioned contiguously to form a digital representation of the entire space 503. The monitoring system controller 103 may then modify this digital representation of the space 503 by removing from it the digital representations of the shape of the determined highest occupied RRPs along with the digital representations of the shape of any RRPs that are below the highest occupied RRP associated with their respective column. The shaped formed by the remaining digital RRP shape representations—which correspond to RRPs above the determined highest occupied RRP of their respective column and thus correspond to the portion of the space 503 the monitoring system controller has determined is unoccupied—form a digital representation of the shape of the unoccupied portion of the space 503.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above described devices, modules, and other functions units may also be combined or may be further divided into a plurality of sub-units.

Spatially relative terms, such as "under", "below", "lower", "over", "upper" and the like, may be used herein for ease of description to describe one element or feature's relationship to another when the apparatus is right side up.

The terms "about" and "approximately" shall generally mean an acceptable degree of error or variation for the quantity measured given the nature or precision of the measurements. Typical, exemplary degrees of error or variation are within 30%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any statements in this disclosure criticizing or disparaging aspects of the prior art are not intended to indicate that what is claimed excludes any of those criticized or disparaged aspects of the prior art.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A method for monitoring a storage space, comprising:

transmitting one or more radio-frequency signals using one or more radars;

receiving reflected echoes of the one or more transmitted radio-frequency signals using the one or more radars, wherein each of the one or more radars are located within a physical volume of a storage space with a position and orientation such that the transmitted radio-frequency signals and their respected reflected echoes propagate through the physical volume of the storage space before the reflected echoes of the transmitted radio-frequency signals are received;

analyzing the received echoes of the transmitted radio-frequency signals to detect one or more scatterers;

processing the received echoes of the radio-frequency signal to determine relative ranges between the detected one or more scatterers and one or more of the one or more radars;

logically dividing the physical volume of the storage space into a grid that includes a plurality of columns and right rectangular prisms (RRP); and determining occupancy information indicating an amount of the physical volume of the storage space occupied by physical objects based on the determined relative ranges of the detected one or more scatterers-, wherein determining occupancy information indicating the amount of physical volume of the storage space occupied by physical objects comprises:

determining, for each column of the grid logically dividing the storage space, a highest right rectangular prism (RRP) of the plurality of RRPs in the column occupied by a detected scatterer, and estimating the amount of the physical volume of the storage space that is occupied by physical objects using the determined highest occupied RRPs of the columns logically dividing the storage space.

2. The method of claim 1, further comprising transmitting the occupancy information to an external system.

3. The method of claim 1, wherein determining for each column of the grid logically dividing the storage space, the highest RRP in the column occupied by a detected scatterer comprises processing the determined relative ranges between the detected one or more scatterers and one or more of the one or more radars to estimate approximate locations of the one or more detected scatters relative to the storage space ranges between the detected one or more scatterers and one or more of the one or more radars.

4. The method of claim 1, wherein estimating the amount of the physical volume of the storage space that is occupied by physical object using the determined highest occupied RRPs of the columns logically dividing the storage space comprises:

determining that, for each column, the highest occupied RRP and all RRPs below the highest occupied RRP are occupied; and determining that, for each column, all RRPs above the highest RRP are unoccupied.

5. The method of claim 1, further comprising determining, based on the analysis of the received echoes of the transmitted radio-frequency signals, a digital representation of an approximate shape of the volume formed by one or more portions of the physical volume of the storage space that are uncopied.

6. The method of claim 5, wherein:

determining occupancy information indicating the amount of physical volume of the storage spaced occupied by physical objects comprises:

determining, for each column of the grid logically dividing the storage space, a highest right rectangular prism (RRP) of the plurality of RRPs in the column occupied by a detected scatterer; and estimating the amount of the physical volume of the storage space that is occupied by physical object using the determined highest occupied RRPs of the columns logically dividing the storage space; and determining the digital representation of the approximate shape of the volume formed by one or more portions of the physical volume of the storage space that are uncopied comprises using the determined highest RRPs of the columns logically dividing the storage space to determine approximate portions of the physical volume of the storage space that are occupied by physical objects.

7. A storage monitoring system, comprising:

a radar array comprising one or more radars that are configured to transmit radio-frequency signals and to receive reflected echoes of the transmitted radio-frequency signals, wherein each of the one or more radars are located within a physical volume of a storage space with a position and orientation such that the transmitted radio-frequency signals and their respected reflected echoes propagate through the physical volume of the storage space before the reflected echoes of the transmitted radio-frequency signals are received; and a controller connected to the one or more radars of the radar array and configured to:

analyze the received echoes of the transmitted radio-frequency signals to detect one or more scatterers;

process the received echoes of the radio-frequency signal to determine relative ranges between the detected one or more scatterers and one or more of the one or more radars;

logically divide the physical volume of the storage space into a grid that includes a plurality of columns and right rectangular prisms (RRP); and determine occupancy information indicating an amount of the physical volume of the storage space occupied by physical objects based on the determined relative ranges of the detected one or more scatterers, wherein determining occupancy information indicating the amount of physical volume of the storage space occupied by physical objects comprises:

determining, for each column of the grid logically dividing the storage space, a highest right rectangular prism (RRP) of the plurality of RRPs in the column occupied by a detected scatterer; and estimating the amount of the physical volume of the storage space that is occupied by physical objects using the determined highest occupied RRPs of the columns logically dividing the storage space.

8. The system of claim 7, further comprising an input/output (IO) interface configured to transmit the occupancy information to an external system.

9. The system of claim 7, wherein determining, for each column of the grid logically dividing the storage space, the highest RRP in the column occupied by a detected scatterer comprises processing the determined relative ranges between the detected one or more scatterers and one or more of the one or more radars to estimate approximate locations of the one or more detected scatters relative to the storage space ranges between the detected one or more scatterers and one or more of the one or more radars.

10. The system of claim 7, wherein estimating the amount of the physical volume of the storage space that is occupied by physical object using the determined highest occupied RRPs of the columns logically dividing the storage space comprises:

determining that, for each column, the highest occupied RRP and all RRPs below the highest occupied RRP are occupied; and determining that, for each column, all RRPs above the highest RRP are unoccupied.

11. The system of claim 7, wherein the controller is further configured to determine, based on the analysis of the received echoes of the transmitted radio-frequency signals, a digital representation of an approximate shape of the volume formed by one or more portions of the physical volume of the storage space that are uncopied.

12. The system of claim 11, further comprising an input/output (IO) interface configured to transmit the determined digital representation of the approximate shape of the one or more unoccupied portions of the physical volume of the storage space to an external system.

13. The system of claim 11, wherein:

determining occupancy information indicating the amount of physical volume of the storage spaced occupied by physical objects comprises:

determining, for each column of the grid logically dividing the storage space, a highest right rectangular prism (RRP) of the plurality of RRPs in the column occupied by a detected scatterer; and estimating the amount of the physical volume of the storage space that is occupied by physical object using the determined highest occupied RRPs of the columns logically dividing the storage space; and determining the digital representation of the approximate shape of the volume formed by one or more portions of the physical volume of the storage space that are uncopied comprises using the determined highest RRPs of the columns logically dividing the storage space to determine approximate portions of the physical volume of the storage space that are occupied by physical objects.

14. A non-transitory computer readable medium comprising instructions that, when executed by one or more processors, cause the one or more processors to monitor a storage space by:

transmitting one or more radio-frequency signals using one or more radars; receiving reflected echoes of the one or more transmitted radio-frequency signals using the one or more radars, wherein each of the one or more radars are located within a physical volume of a storage space with a position and orientation such that the transmitted radio-frequency signals and their respected reflected echoes propagate through the physical volume of the storage space before the reflected echoes of the transmitted radio-frequency signals are received;

analyzing the received echoes of the transmitted radio-frequency signals to detect one or more scatterers; logically dividing the physical volume of the storage space into a grid that includes a plurality of columns and a plurality of right rectangular prisms (RRP);

processing the received echoes of the radio-frequency signal to determine relative ranges between the detected one or more scatterers and one or more of the one or more radars; and determining occupancy information indicating an amount of the physical volume of the storage space occupied by physical objects based on the determined relative ranges of the detected one or more scatterers, wherein determining occupancy information indicating the amount of physical volume of the storage space occupied by physical objects comprises:

determining, for each column of the grid logically dividing the storage space, a highest right rectangular prism (RRP) of the plurality of RRPs in the column occupied by a detected scatterer; and estimating the amount of the physical volume of the storage space that is occupied by physical objects using the determined highest occupied RRPs of the columns logically dividing the storage space.

15. The non-transitory computer readable medium of claim 14, wherein the instructions further cause the one or more processors monitor a storage space by transmitting the occupancy information to an external system.

16. The non-transitory computer readable medium of claim 14, wherein determining, for each column of the grid logically dividing the storage space, the highest RRP in the column occupied by a detected scatterer comprises processing the determined relative ranges between the detected one or more scatterers and one or more of the one or more radars to estimate approximate locations of the one or more detected scatters relative to the storage space ranges between the detected one or more scatterers and one or more of the one or more radars.

17. The non-transitory computer readable medium of claim 14, wherein estimating the amount of the physical volume of the storage space that is occupied by physical object using the determined highest occupied RRPs of the columns logically dividing the storage space comprises:

determining that, for each column, the highest occupied RRP and all RRPs below the highest occupied RRP are occupied; and determining that, for each column, all RFPs RRPs above the highest RRP are unoccupied.

18. The non-transitory computer readable medium of claim 14, wherein the instructions further cause the at least one processor to monitor a storage space by determining, based on the analysis of the received echoes of the transmitted radio frequency signals, a digital representation of an approximate shape of the volume formed by one or more portions of the physical volume of the storage space that are uncopied.

19. The non-transitory computer readable medium of claim 18, wherein:

determining occupancy information indicating the amount of physical volume of the storage spaced occupied by physical objects comprises:

determining, for each column of the grid logically dividing the storage space, a highest right rectangular prism (RRP) of the plurality of RRPs in the column occupied by a detected scatterer, and estimating the amount of the physical volume of the storage space that is occupied by physical object using the determined highest occupied RRPs of the columns logically dividing the storage space; and determining the digital representation of the approximate shape of the volume formed by one or more portions of the physical volume of the storage space that are uncopied comprises using the determined highest RRPs of the columns logically dividing the storage space to determine approximate portions of the physical volume of the storage space that are occupied by physical objects.

* * * * *